Patented Aug. 13, 1929.

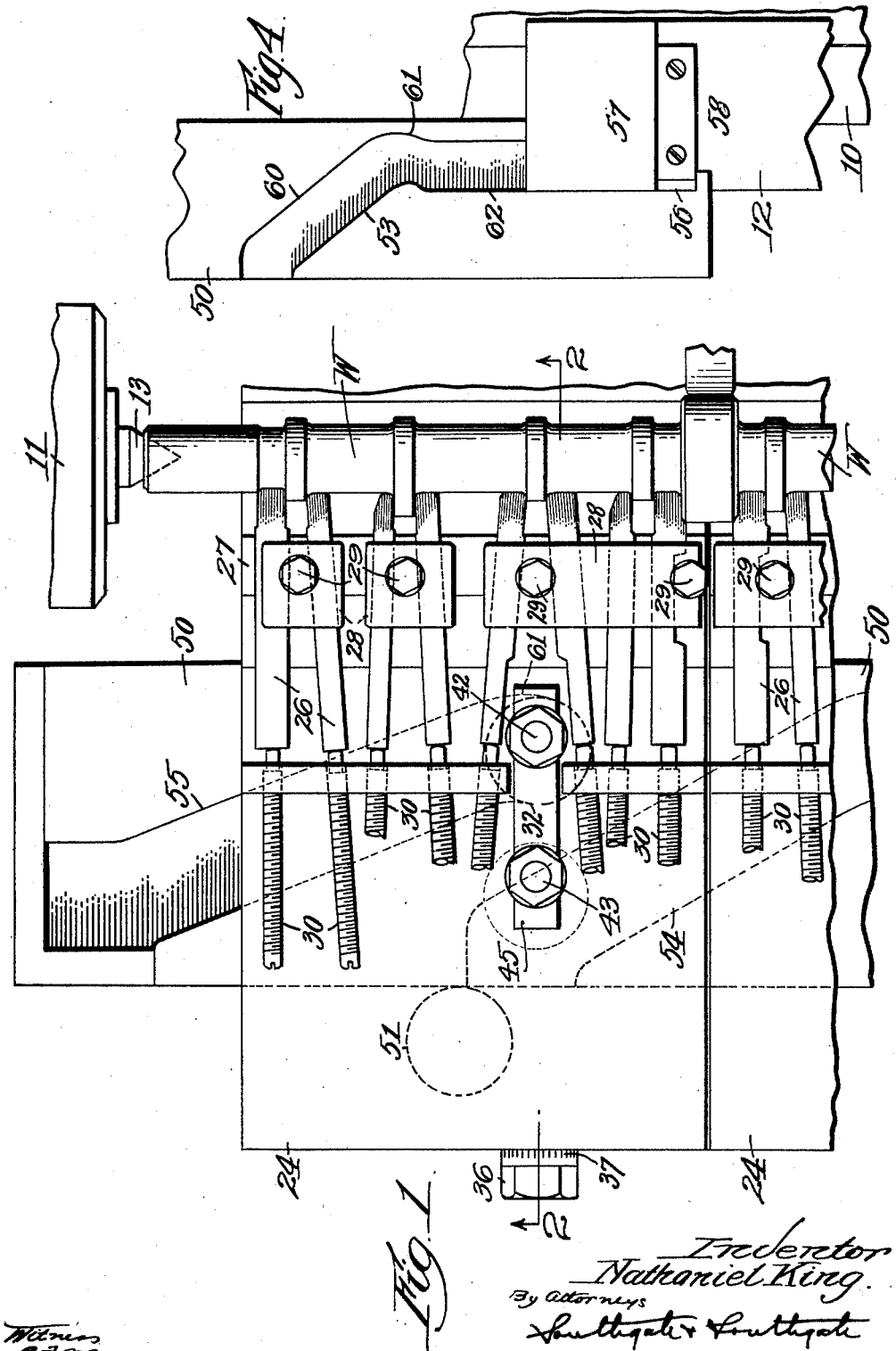

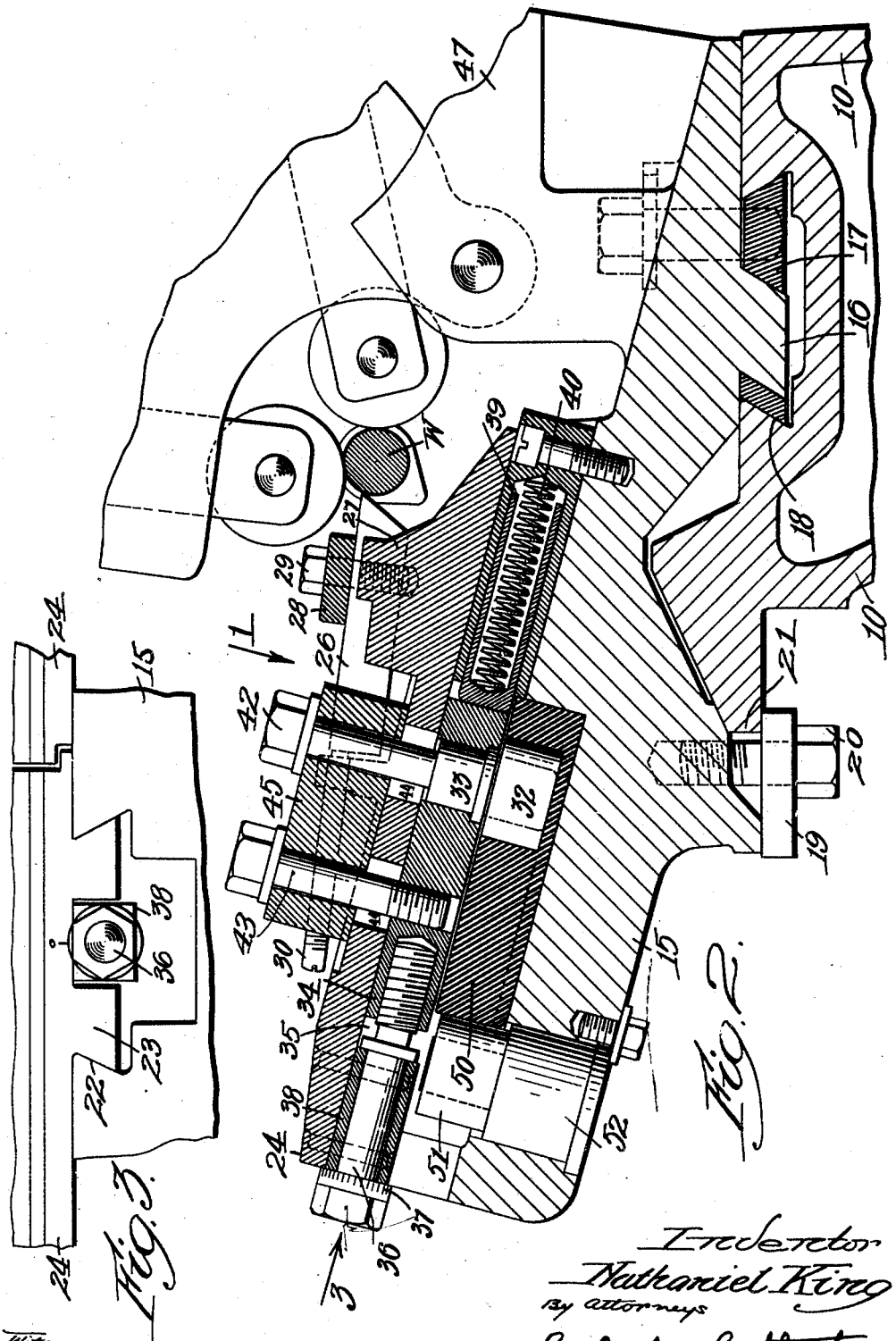

1,724,285

UNITED STATES PATENT OFFICE.

NATHANIEL KING, OF FITCHBURG, MASSACHUSETTS, ASSIGNOR TO SENECA FALLS MACHINE CO., OF FITCHBURG, MASSACHUSETTS, A CORPORATION OF MASSACHUSETTS.

SQUARING ATTACHMENT FOR LATHES.

Application filed June 30, 1924. Serial No. 723,109.

This invention relates to engine lathes and particularly to an improved tool holding and actuating mechanism therefor. It is customary in a certain type of lathe to square-up cam shafts or other similar work by using a large number of separate tools which finish many different surfaces on the shaft at a single operation. It is not desirable, however, that all of the tools shall take their maximum cut at the same time, as the work commonly lacks sufficient stiffness to withstand the strain.

It is the general object of my invention to provide an improved tool actuating mechanism for such a lathe and more particularly to provide a mechanism by which two or more tool slides may be so actuated that the tools carried thereby will take their maximum cuts successively rather than simultaneously.

A further object of my invention is to provide such a mechanism in the form of an attachment which may be readily applied to or removed from a lathe, leaving the lathe otherwise available for general purposes.

My invention further relates to arrangements and combinations of parts which will be hereinafter described and more particularly pointed out in the appended claims.

A preferred form of the invention is shown in the drawings in which

Fig. 1 is a plan view of my improved tool actuating mechanism;

Fig. 2 is a transverse sectional elevation, taken along the line 2—2 in Fig. 1;

Fig. 3 is a detail front elevation, looking in the direction of the arrow 3 in Fig. 2; and Fig. 4 is a detail plan view of a portion of the actuating cam plate and its connection to the tool carriage.

Referring to the drawings, I have shown certain parts of an engine lathe including a frame or bed 10, a portion of a head stock 11 and a portion of a tool carriage 12. The work W is rotatably mounted upon a live center 13 in the head stock 11 and upon a corresponding tail center (not shown).

My improved squaring attachment is constructed as a separate and detachable unit and comprises a base 15 having a downward projection 16 (Fig. 2) and a clamping bar 17 by which it may be secured in a guideway 18 formed in the top of the frame or bed 10. A clamping plate 19 and bolt 20 also secures the front lower edge of the base 15 to the forwardly projecting flange 21 of the bed 10. The base 15 may thus be adjusted axially of the lathe to any desired position between the centers and may be firmly secured in accurate alignment on the frame or bed 10.

The base 15 is provided with one or more transversely extending dove-tail guide-ways 22 (Fig. 3) in each of which is slidable a correspondingly shaped projection 23 formed on the lower side of a tool holding slide 24. A plurality of turning and squaring tools 26 are positioned in slots in an upwardly extending portion 27 of the tool slide and are secured therein by clamping plates 28 and screws 29. Adjusting screws 30 are provided for setting the separate tools and for resisting the thrust of the work thereon.

Each tool holding slide is provided with a cam roll 32 (Fig. 2) rotatable upon a stud 33 fitted in a block 34. Each block 34 is slidable in a recess 35 in the under side of its tool slide 24 and may be adjusted toward and from the work by a threaded stud or screw 36 having graduations 37 on the head thereof. The stud 36 is rotatable in a bearing block 38 secured to the tool slide 24 but is held from axial movement therein. Rotation of the stud thus moves the threaded block 34 toward or away from the work.

A plunger 39 is actuated by a spring 40 to engage the rear end of the block 34 and take up any back lash between the block 34, the roll 32 and a cam plate 50 to be described. When the block 34 and roll 32 are adjusted to a desired position, the block 34 is securely clamped by means of a nut 42 on the stud 33 and a binding screw 43. The stud 33 and screw 43 both extend through slots 44 in the slide 24 and also through a clamping block 45 mounted on the slide. A back rest 47 is formed on the rear part of the base 15 and holds the work W firmly against the tools 26.

A cam plate 50 is slidable in a longitudinal bearing in the base 15 and at its front edge it engages guide-rolls 51 mounted on studs 52 (Fig. 2) secured in the base 15. The cam plate 50 is provided with one or more cam slots 53, 54 and 55 by which tool slides 24 may be successively advanced toward the work W. Each cam slot co-operates with the cam roll 32 upon an associated slide 24. The cam plate 50 is connected at one end in any convenient manner to the tool carriage 12. In Fig. 4, the cam plate is shown as having a recess 56 to receive a projection 57 and block 58 on the tool carriage 12.

The cam slot 53, as indicated in Fig. 4, is provided with a tool advancing portion 60, a tool retracting portion 61 and a straight portion 62 extending parallel to the line of movement of the cam plate. The cam slot 54 is similarly formed but with a shorter straight portion and the cam slot 55 substantially omits the straight portion but is provided with a retracting portion 61.

Having described the construction of my improved squaring attachment, the operation thereof will be easily apparent. As the cam plate 50 is moved to the left in Fig. 1, the cam slot 53 first advances the tool slide nearest the tail stock and, after the tools thereon have completed their maximum cut, it slightly withdraws the tool slide and thereafter holds the slide in retracted position during the continued movement of the cam plate. At the same time the slots 54 and 55 are advancing their respective tool slides, the movement being slightly later for each successive slide, so that each slide completes its maximum cut and is slightly withdrawn before the next slide reaches its maximum cut. In this way the tools on each separate slide perform their maximum cuts at successive intervals and do not exert their combined strain upon the work at any one time.

The device is actuated, as previously described, by attaching the cam plate 50 to the regular tool carriage 12 which may be operated by the usual carriage feeding mechanism (not shown). After the cut is completed, the carriage 12 and cam plate 50 are moved in the reverse direction to return the tool slides 24 to their original positions. The guide-rolls 51 resist the outward thrust on the cam plate 50 as the tools engage the work.

Having thus described my invention, it will be seen that I have devised a very simple and effective tool actuating mechanism by which a plurality of tools may be automatically advanced in successive groups to operative position. The tools may be separately adjusted by means of the screws 30 and each tool slide 24 may be adjusted relative to the other slides by means of its threaded stud 36.

Having thus described my invention and the advantages thereof, I do not wish to be limited to the details herein disclosed otherwise than as set forth in the claims, but what I claim is:—

1. In a lathe having a tool carriage, a plurality of tools, a plurality of tool holding slides, a support for said slides adjustable axially of the lathe but held in fixed axial position during the operation of said tools, and operating means connected to said carriage for actuation thereby effective to successively advance said slides and tools in predetermined order to take substantially radial cuts in the work and to thereafter successively slightly retract said slides and tools in the same order.

2. In a lathe having a tool carriage, a plurality of tools, a plurality of tool holding slides, a support for said slides adjustable axially of the lathe but held in fixed axial position during the operation of said tools, and operating means connected to said carriage for actuation thereby effective to successively advance said slides and tools in predetermined order to take substantially radial cuts in the work and to thereafter successively slightly retract said slides and tools in the same order, the successive advance and retracting movements of all of said slides and tools being produced by a single continuous movement of said operating means in one direction axially of said lathe.

3. In a lathe having a tool carriage, a plurality of tools, a plurality of tool holding slides, and a single actuating member for said slides, connected to said carriage for actuation thereby, said member having a continuous operative movement in one direction, thereby successively giving each slide and the tools supported thereby an advancing radial cutting stroke and thereafter slightly retracting said slide and the tools supported thereby as the movement of said actuating member continues in the same direction.

4. In a lathe having a tool carriage, a plurality of tools, a plurality of tool holding slides mounted to move in parallel paths transversely of the lathe, said slides being fixed longitudinally of the lathe during the operation of said tools, an actuating member, and means including a connection to said carriage, to move said member axially of the lathe, said member being effective to move said tool slides and tools successively toward the work to each thereby effect a radial cutting stroke and to thereafter slightly withdraw each slide and the tools supported thereby as the next succeeding slide approaches its extreme inward operative position.

5. In a lathe, a plurality of tools, a plurality of tool holding slides mounted to move in parallel paths transversely of the lathe, an actuating member, means to move said member axially of the lathe, and a cam roll for each slide, said member having a cam slot for each roll and said rolls and slots being relatively positioned and co-operating to successively advance said slides and thereby give the tools supported thereby successive operative cutting movements toward the axis of the work.

6. In a lathe, a tool, a tool holding slide fixed axially of said lathe during the operation of said tool, an actuating member, and means to move said member axially of the lathe, said member and tool slide having a co-operating cam slot and cam roll by which said tool slide is moved by said member transversely of the lathe to give said tool a radial cutting stroke, and said cam slot having a retracted portion effective to slightly withdraw the tool from the work on continued movement of said member in the same direction.

7. In a lathe, a plurality of tools, a plurality of tool holding slides mounted to move in parallel paths transversely of the lathe, a tool carriage, an actuating member, and connections from said carriage to said member through which said member is moved axially of the lathe, said slides being thereby successively advanced on radial cutting strokes to extreme inward cutting position and said slides being each thereafter successively slightly retracted to relieve the tool pressure thereof on the work during the final advance movements of the succeeding slides and tools.

8. In a lathe, having a tool carriage, a plurality of tool slides, a support for said slides mounted on the lathe frame independently of said carriage, operating means effective to successfully advance said slides in predetermined order to take substantially radial cuts in the work, and to thereafter successively retract said slides, said operating means comprising a slide engaging element connected to said carriage and movable by said carriage during normal travel thereof axially of the lathe.

In testimony whereof I have hereunto affixed my signature.

NATHANIEL KING.